(12) United States Patent
Boozer et al.

(10) Patent No.: US 8,147,125 B2
(45) Date of Patent: Apr. 3, 2012

(54) TURBULENCE-REDUCING BLENDER LID AND METHOD OF OPERATION

(75) Inventors: Richard D. Boozer, Wakeman, OH (US); Michael D. Anton, Olmsted Township, OH (US); John K. Barnard, Olmstead Falls, OH (US)

(73) Assignee: Vita-Mix Corporation, Cleveland, OH (US)

( * ) Notice: Subject to any disclaimer, the term of this patent is extended or adjusted under 35 U.S.C. 154(b) by 667 days.

(21) Appl. No.: 12/316,569

(22) Filed: Dec. 15, 2008

(65) Prior Publication Data

US 2010/0149909 A1    Jun. 17, 2010

(51) Int. Cl.
*B01F 15/00* (2006.01)
(52) U.S. Cl. ........................................ 366/347
(58) Field of Classification Search .................. 366/347
See application file for complete search history.

(56) References Cited

U.S. PATENT DOCUMENTS 4,410,280 A * 10/1983 Yamauchi et al. ............ 366/314

FOREIGN PATENT DOCUMENTS

GB    2 238 712 A    12/1991

OTHER PUBLICATIONS

PCT International Preliminary Report on Patentability and Written Opinion (dated Jun. 30, 2011—7 pages).
PCT International Search Report, dated Jan. 20, 2010, 3 pages.
PCT Written Opinion, dated Jan. 20, 2010, 5 pages.

* cited by examiner

*Primary Examiner* — Yogendra Gupta
*Assistant Examiner* — Alison Hindenlang
(74) *Attorney, Agent, or Firm* — Renner, Kenner, Greive, Bobak, Taylor & Weber

(57) ABSTRACT

The open top of a blender container (11) is closed by a cover (10). The cover (10) is provided with an internal vane (25) which extends downwardly from the top wall (17) of the cover (10) and inwardly from the sidewall (16) of the cover (10). The vane (25) disrupts any turbulence which might be created by a fluid being mixed in the container (10).

12 Claims, 2 Drawing Sheets

TURBULENCE-REDUCING BLENDER LID AND METHOD OF OPERATION

TECHNICAL FIELD

This invention relates to a lid for a container of a blender and its method of operation. More specifically, this invention relates to a lid which reduces turbulence in the container as a food product is being blended in the container.

BACKGROUND ART

Food products are often mixed in the container of a blender or food processor. A cover or lid, which is often made of a flexible rubber-like material, is placed on the container, and blades positioned in the bottom of the container mix the food, at least a portion of which is a liquid material. At times, particularly when the container is nearly full of a liquid material, the agitation of the blades causes the liquid to swirl which could result in a great deal of turbulence in the container. Such turbulence can cause the container to rock or sway and can cause the cover to undulate. If allowed to continue, such could result in the container actually falling off of the base of the blender or the cover coming loose from the container allowing the contents to spill out of the container.

DISCLOSURE OF THE INVENTION

It is thus an object of one aspect of the present invention to provide a cover for a blender container which reduces turbulence in the container.

It is an object of another aspect of the present invention to provide a cover for a blender container, as above, which minimizes the possibility of the container wobbling and the cover undulating.

It is an object of a further aspect of the present invention to provide a cover for a blender container, as above, which will remain attached to the container under the most severe mixing conditions.

It is an object of yet another aspect of the present invention to provide a cover for a blender container, as above, which will enable the container to be maintained on the base of the blender under the most severe mixing conditions.

It is an object of an additional aspect of the present invention to provide a method of minimizing the turbulence that might be created in a blender container.

These and other objects of the present invention, as well as the advantages thereof over existing prior art forms, which will become apparent from the description to follow, are accomplished by the improvements hereinafter described and claimed.

In general, a cover which is adapted to be attached to a container and which is made in accordance with the present invention includes a top wall and a sidewall extending downwardly from the top wall. A vane extends downwardly from the top surface and extends inwardly from the sidewall.

In accordance with another aspect of the invention, a cover is adapted to be attached to the container of a blender. The cover includes a top wall, a sidewall, and means to minimize turbulence in the container.

The invention also contemplates a method of minimizing turbulence which might be created in the blender container having an open top and includes the step of closing the open top with a cover thereby positioning a vane carried by the cover in the path of the turbulence.

A preferred exemplary cover for a blender container according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
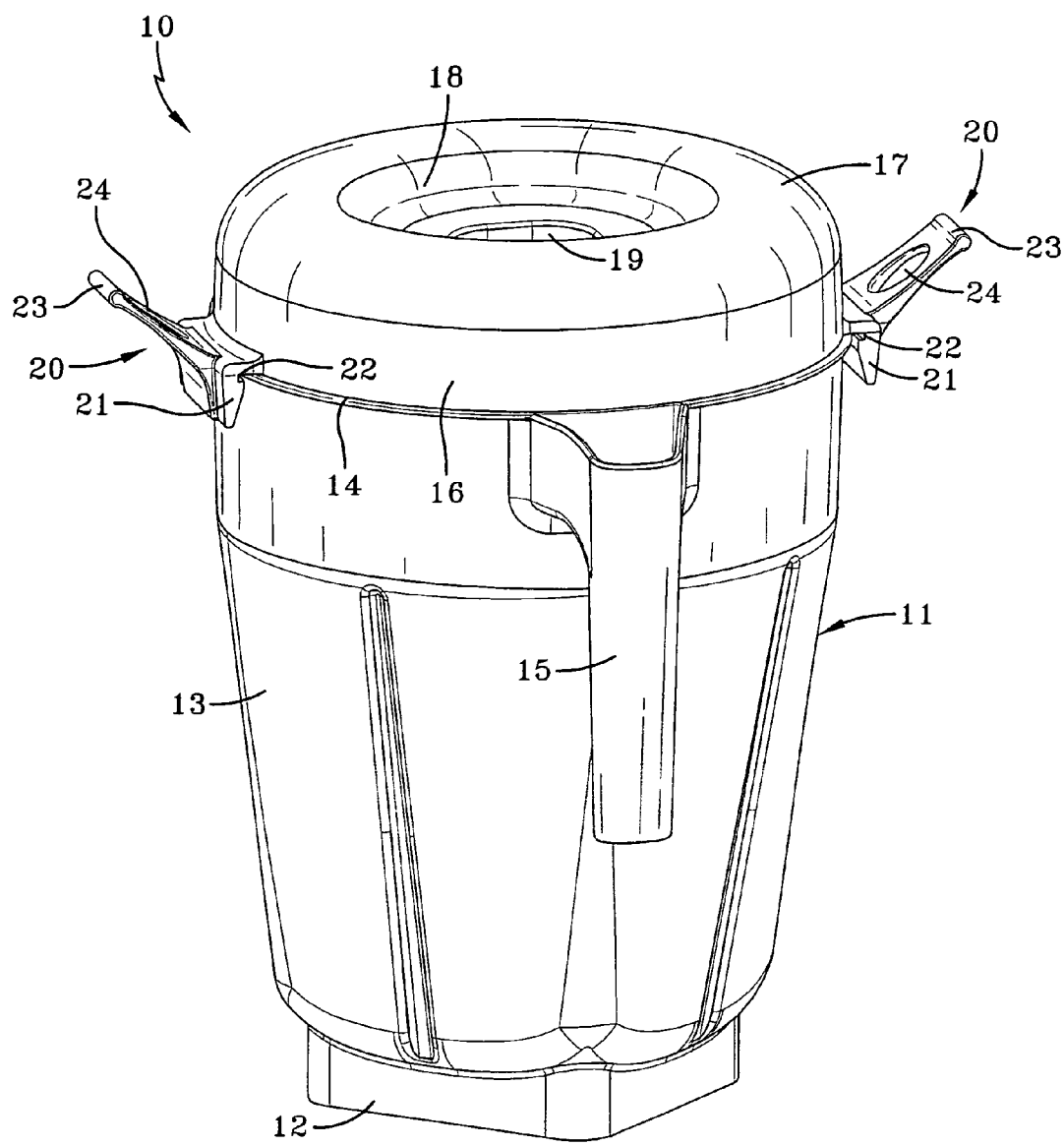
FIG. 1 is a perspective view of a blender container having a cover made in accordance with the present invention.

A cover made in accordance with the present invention is generally indicated by the numeral 10 and is adapted to be used with a blender container generally indicated by the numeral 11.

Container 11 includes a base skirt 12 which is adapted to be carried by the motor components of a blender. A sidewall or sidewalls 13 extend upwardly from a bottom surface (not shown) positioned above skirt 12, and form an open top. Sidewalls 13 are shown as being generally circular in configuration and thus, in essence, only one continuous sidewall is shown. However, the container 11 could take on any configuration, such as square and therefore having four sidewalls, without departing from the concepts of the present invention. A rim 14 extends outwardly from the periphery of the open top at the top of sidewall 13. A blender blade (not shown) is located above and near the bottom surface to mix or otherwise process foods as is well known in the art. A handle 15 may be carried by sidewalls 13, and a pouring spout (not shown) may be formed near the top of sidewalls 13 opposed to handle 15.

Cover 10 may be formed of a resilient or elastomeric material such as most known thermoplastic elastomers (TPE's). Such TPE's include, for example, thermoplastic olofin rubbers, thermoplastic vulcanizates, and thermoplastic elastic block copolymers. These materials are particularly suited for cover 10 as they all exhibit the elastomeric properties required for cover 10 if it is to be readily attached to and removable from container 11 as will hereinafter be described.

Cover 10 is configured to match the configuration of the open top of container 11 and thus, in the embodiment shown, it includes a round sidewall 16 and a somewhat domed top wall 17 which is dished out, as at 18. Dished out area 18 is provided with a central aperture 19 which is normally closed by a plug (not shown), but which when open provides access to the inside of container 11 should stirring or the like be desired.

Sidewall 16 of cover 10 is shown as carrying two diametrically opposed tab assemblies generally indicated by the numeral 20. Each tab assembly 20 includes a body portion 21 carried by sidewall 16. A notch 22 is formed in body portion 21, and a handle 23 having a finger hole 24 extends angularly upwardly and outwardly from body portion 21. When cover 10 is on container 11, container rim 14 is received in the notch 22 of tab assemblies 20.

To remove cover 10 from container 11, one needs to merely lift handle 23 upwardly, which can be conveniently accomplished by placing a finger in hole 24, to flex handle assembly 20 thereby releasing rim 14 from notch 22. Reference is made to U.S. patent application Ser. No. 12/221,158 filed on Jul. 30, 2008, for whatever further details may be necessary to understand the manner in which cover 10 attaches to container 11.

Figure 2:
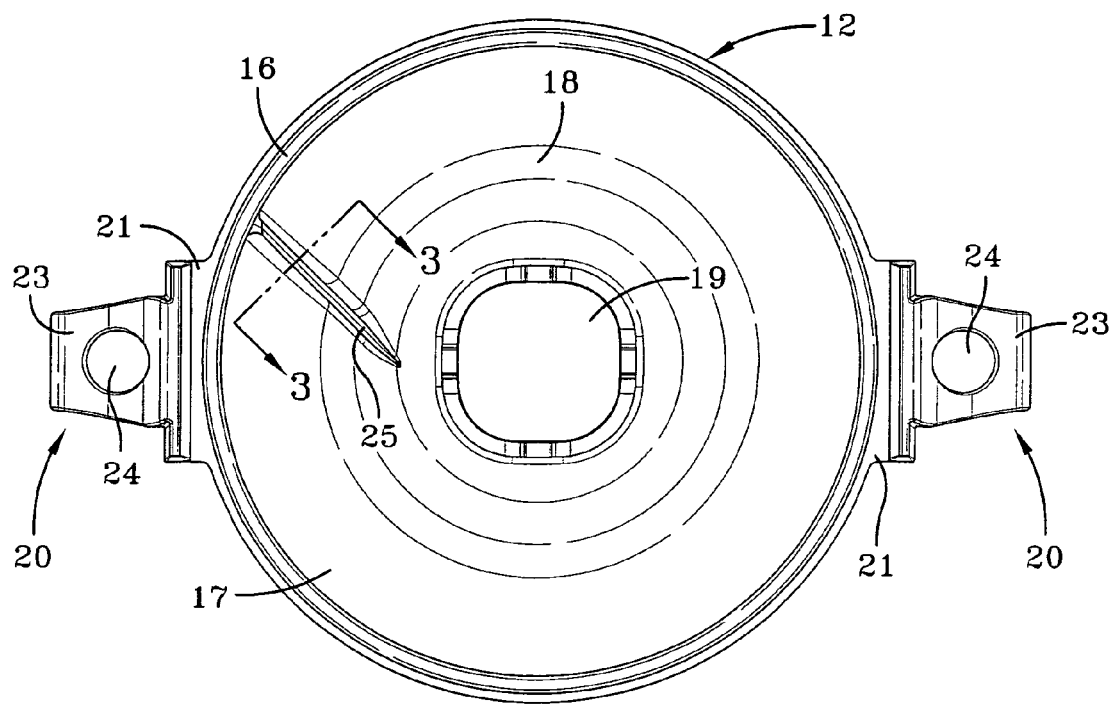
FIG. 2 is a bottom plan view of the cover of the present invention.
Figure 3:
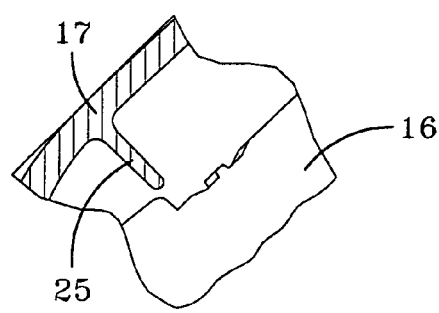
FIG. 3 is a fragmentary sectional view taken substantially along line 3-3 of FIG. 2.

As previously described, with cover 10 on container 11 and with an at least partially liquid-based food being mixed in container 11, container 11 could begin to wobble or sway and cover 10 could vibrate or undulate, particularly if container 11 is nearly full of the liquid food. In order to prevent such, at least one turbulence interrupting vane 25 is formed on the underside of cover 10. Vane 25 extends downwardly from cover top wall 17 and inwardly from cover sidewall 16. As shown in FIG. 3, the height of vane 25 extends substantially the entire height of sidewall 16. In addition, vane 25 extends a length almost to cover aperture 19 and, as shown in FIG. 2, does not extend directly radially from sidewall 16. Rather, vane 25 is preferably angled, from radial, away from the direction of circulation of the fluid in container 11 caused by the rotation of the blade. Whether so angled or not, the presence of vane 25 reduces, and can eliminate, the turbulence which might be created within container 11.

In view of the foregoing, it should be evident that a container and cover made in accordance with the present invention, as described herein, accomplishes the objects of the present invention and otherwise substantially improves the art.

What is claimed is:

1. A cover adapted to be attached to a container comprising a top wall having a generally centrally located aperture, a sidewall extending downwardly from said top wall, and a single vane extending downwardly from said top wall and inwardly from said sidewall, said vane extending along said top wall to near said aperture.

2. The cover of claim 1 wherein said sidewall has a height and said vane extends substantially the height of said sidewall.

3. The cover of claim 1 wherein said sidewall is generally circular and said vane extends nonradially from said sidewall.

4. The cover of claim 3 wherein a fluid is adapted to circulate in the container, said vane being angled away from the circulation of the fluid.

5. A cover adapted to be attached to the container of a blender comprising a top wall, a sidewall, and means to minimize turbulence in the container.

6. The cover of claim 5 wherein said means includes a vane extending from said sidewall.

7. The cover of claim 6 wherein said vane extends downwardly from said top wall.

8. The cover of claim 7 wherein said sidewall has a height and said vane extends substantially the height of said sidewall.

9. The cover of claim 8 wherein said top wall includes a generally centrally located aperture, said vane extending to near said aperture.

10. The cover of claim 9 wherein said sidewall is generally circular and said vane extends nonradially from said sidewall.

11. The cover of claim 10 wherein a fluid is adapted to circulate in the container, said vane being angled away from the circulation of the fluid.

12. In combination, a container and a cover, the container having an open top and a rim at the periphery of said open top, the cover having a top wall with a generally centrally located aperture, a sidewall extending downwardly from said top wall, said sidewall having at least one tab which engages said rim so that the cover matingly engages the container, and a vane extending downwardly along said top wall from generally adjacent to said aperture to said sidewall, said aperture being the only opening adjacent to said vane.

\* \* \* \* \*